July 18, 1961

W. J. FALLOWS, JR 2,992,631

HYDRAULIC STROKE LIMITER

Filed Aug. 20, 1957

INVENTOR.
Walter J. Fallows Jr
BY
Clyde H. Haynes
his Atty

United States Patent Office 2,992,631
Patented July 18, 1961

2,992,631
HYDRAULIC STROKE LIMITER
Walter J. Fallows, Jr., Grand Rapids, Mich., assignor to Lear, Incorporated
Filed Aug. 20, 1957, Ser. No. 679,276
7 Claims. (Cl. 121—38)

This invention relates to a valving device interassociated with an actuator and a control therefor to impart desired movement to the actuator and to limit the stroke of each movement.

In aircraft control systems there is usually an automatic controlling device responsive to aerodynamic parameter or sensing means and a pilot operated controlling device. These devices are coupled together in such manner that safe flight operation of the aircraft is maintained and movements of the aircraft parts are held between pre-determined minimum and maximum strokes.

In the past, various mechanical devices, such as cams, mechanical connections, and the like, were associated with an actuator and to limit the stroke of such movement. However, these mechanical devices required considerable power to operate them since the power of one of the controlling devices had to be overcome in many instances to limit the stroke of the movement of the actuator or to impart a desired movement thereto.

The present invention may be used in connection with various aircraft control systems and particularly those systems which have fluid driven actuators for imparting movement to a reciprocally movable ram or control member. For purpose of illustration and not of limitation, an application for the device may be found in the pitch control system of a high performance aircraft. Such a system usually includes a control stick, a stability augmentation actuator and a boost or power control system. The stability augmentation actuator is mounted in association with the control stick so that movements imparted by the augmentation actuator are superimposed on those of the control stick in such manner that the summation or differential of the two movements is applied to a control system for an aircraft.

The stability augmentation actuator must have sufficient stroke authority when the aircraft is in high altitude and low speed flight to dampen adequately airframe oscillations. The stroke authority must be limited when the aircraft is flying at low altitude high speed conditions to keep stresses induced in the airframe within allowable safe stress limits. In other words, the device must be capable of limiting the actuator stroke or imparting movement thereto to maintain it within safe stroke limits compatible with aerodynamic and airframe parameters and design.

In view of the foregoing, it is apparent that one of the objects of the present invention is to overcome the aforementioned problems and others encountered with prior devices.

The present invention has for one of its objects the provision of a device which will readily and with little power limit the stroke of a reciprocally actuated member without requiring forces to overcome forces used to reciprocate the member.

Another object of the present invention is to provide a stroke limiter which is efficient in operation, compact in construction and economical to manufacture.

A further object of the invention is to provide a fluid, hydraulic or gas operated device interassociated with a reciprocally movable member to control the reciprocal movement of that member.

A further object of the invention is to provide a fluid operated device which is adjustable to vary the movement of a reciprocally actuated member.

A further object of the invention is to provide a fluid operated device which is adjustable to vary the movement of a reciprocally actuated member wherein the device is adjusted in accordance with conditions independent of the mechanism to reciprocate the actuated member.

Further objects and a fuller understanding of the invention will become apparent from the physical structure herein set forth to carry out the invention.

It is understood that the use of certain terms or names of specific parts herein, or the illustration in the drawings of specific parts is for the purpose of better understanding the invention and that such terms or illustrations are meant to include mechanically or functionally equivalent parts which may be substituted therefor where practical.

This structure includes a fluid driven actuator, a servo valve and a valving device interassociated between the actuator and the servo valve to impart desired movement to the actuator and limit the stroke of each movement. The actuator includes a cylinder and a piston or ram which is reciprocally movable. The cylinder and the servo valve are interconnected by the valving device in such manner that the servo valve may be positioned to cause movement of the piston from one end to the other end of the cylinder.

The valving device interposed between the servo valve and the cylinder has a pair of two-way valves, each of which is provided with a valve spool. A control is connected to the piston in the cylinder to engage at least one of the spools and move the same to close the valve upon movement of the piston to a pre-determined position. This control may take physical form in a rod connected to the piston for axial movement therewith. A fixed bumper is threaded on the rod and is associated with one of the spools to move it upon movement of the rod in one direction and a second bumper is threaded on the rod and associated with the other of the spools to move it upon movement of the rod in the opposite direction. The control further includes a pivotally mounted arm interconnecting the spools to impart movement of either spool to the other spool. Adjustment of the positions of the bumpers on the rod is had by providing a servo motor or other suitable means for rotating the rod to position the bumpers therealong.

A specific embodiment of the invention will hereinafter be described for purposes of exemplification and not of limitation, reference being had in the accompanying drawings in which.

Figure 1:
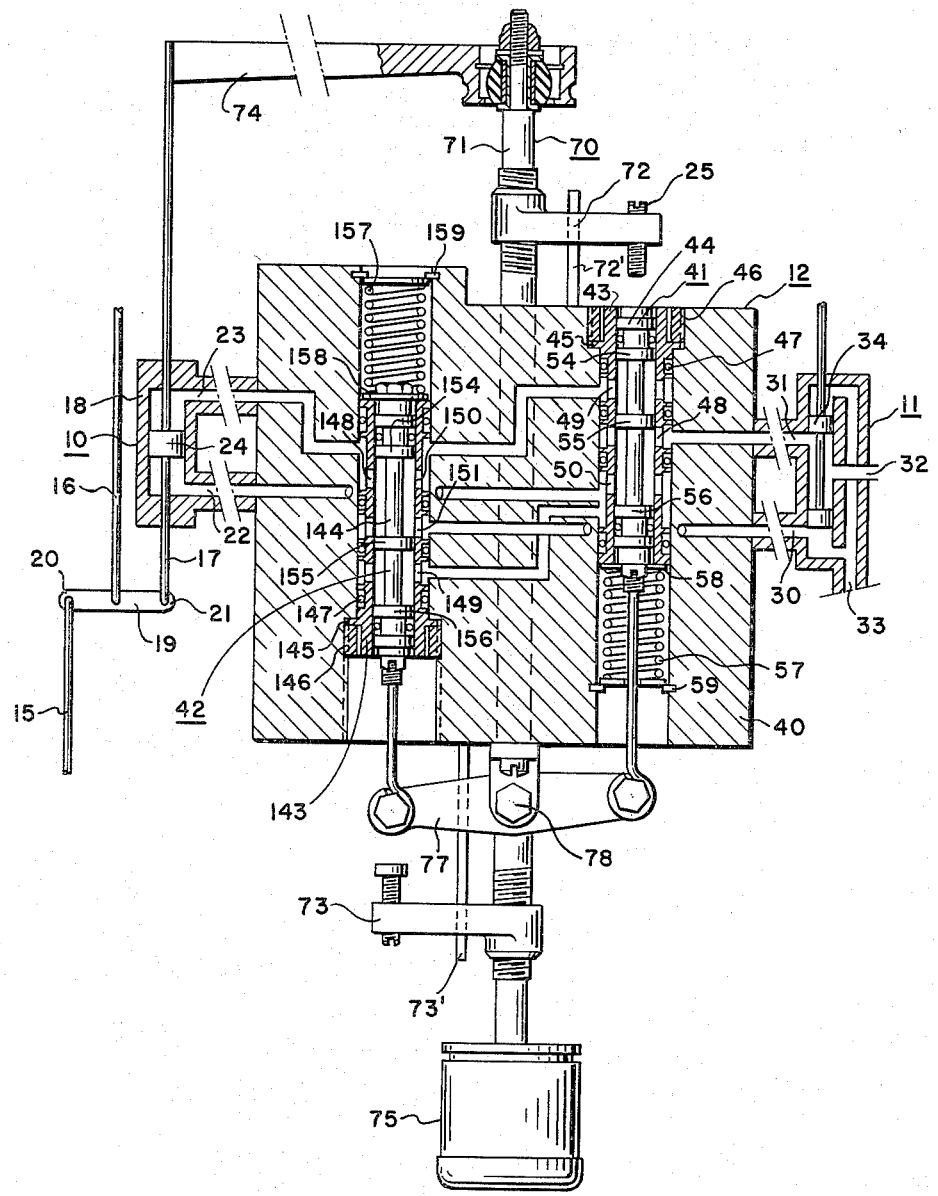
FIGURE 1 is a plan view with certain parts illustrated in cross section.

Referring now to the drawings and particularly to FIGURE 1, there is illustrated an actuator 10 and a servo valve 11 interconnected through a valving device 12. The actuator 10 is adapted to reciprocate or position an actuated member 15 by means of an actuating member 16 or a piston rod 17 in a hydraulic cylinder 18. In a specific application in aircraft, the actuated member 15 may, for example, be connected to an elevator and the actuating member 16 to the control stick, thus providing mechanical control of the elevator by the pilot moving the control stick. It is understood that the device may be used in similar manner with other controls of the aircraft. The actuated member 15 is connected to the actuating member 16 and the piston rod 17 by a rocker arm 19 pivotally mounted on the actuating member 16 with one end 20 connected to the actuated member 15 and the other end 21 connected to piston rod 17.

As is further illustrated, the cylinder 18 has a port 22 at one end thereof and a port 23 at the other end thereof with a piston 24 fixed on rod 17 and movable between these ports.

The servo valve 11 has ports 30 and 31 and an inlet port 32 and a reservoir port 33 in the valve body thereof. The valve 11 also has a well known spool 34 which is movable relative to the ports 30 and 31 to control the flow of fluid from the inlet port 32 through one or the other of the ports 30 or 31 in such manner that when fluid from the inlet port 32 is flowing through one of the ports 30 or 31, the other port 30 or 31 is connected to the reservoir port 33.

The stroke limiter device 12 comprises a block or similar structure 40 supporting spool type valves 41 and 42. The valve 41 is constructed from a sleeve 43 and a spool 44 with the sleeve 43 fixed in a bore in the block 40 and the spool 44 reciprocally movable in the sleeve 43. The sleeve 43 is fixed in the bore so that it is nonmovable relative to the block 40 by providing the sleeve with a flange 45 and providing the block with a nut 46 which tightens against the flange to press it against a shoulder portion of the block. Leakage of any fluid out of the valve between the sleeve 43 and the block 40 or between spool 44 and sleeve 43 may be prevented by other suitable seals, such for example, O-rings 47 interposed between the outer diameter of the sleeve and the inner diameter of the block or between spool and sleeve. The sleeve 43 has a port 48 connected to port 31 of servo valve 11 and ports 49 and 50, the ports 49 and 50 being axially spaced along the sleeve and on axially opposite sides of the port 48.

The spool 44 has axially spaced lands 54, 55 and 56 spaced apart axially a distance such that fluid may flow from port 48, between lands 55 and 56 to port 50 when spool 44 is in one position and from port 48 between lands 54 and 55 to port 49 when the spool is in another position, or vice versa. The spool is urged to one position by a coil spring 57 compressed between a washer 58 on one end of the spool 44 and a stop 59 in the bore of the block 40.

The valve 42 is constructed from a sleeve 143 and a spool 144 with the sleeve 143 fixed in a bore in the block 40 and the spool 144 reciprocally movable in the sleeve 143. The sleeve 143 is fixed in the bore so that it is non-movable relative to the block 40 by providing the sleeve with a flange 145 and providing the block with a nut 146 which tightens against the flange to press it against a shoulder portion of the block. Leakage of any fluid out of the valve between the sleeve 143 and the block 140 or between spool 144 and sleeve 143 may be prevented by suitable seals, such for example, O-rings 147 interposed between the outer diameter of the sleeve and the inner diameter of the block or between spool and sleeve. The sleeve 143 has ports 148, 149, 150 and 151, the ports 149, 150 and 151 being axially spaced along the sleeve and on axially opposite sides of the port 148.

The spool 144 has axially spaced lands 154, 155 and 156 spaced apart axially a distance such that fluid may flow from port 148, between lands 154 and 155 to port 150 when spool 144 is in one position and from port 149 between lands 155 and 156 to port 151 when the spool is in another position, or vice versa. The spool is urged to one position by a coil spring 157 compressed between a washer 158 on one end of the spool 144 and a stop 159 in the bore of the block 40.

The ports of servo valve 11, valves 41 and 42 and cylinder 18 are connected at follows:

Port 32 is connected to suitable pumps or pressure source (not shown).

Port 33 is connected to suitable reservoir as exhaust means (not shown).

Port 31 is connected to port 48.
Port 30 is connected to port 151.
Port 49 is connected to port 150.
Port 50 is connected to port 22.
Port 50 is connected to port 149.
Port 148 is connected to port 23.

The spools 44 and 144 are actuated by a control 70 which has a rod 71 threaded with left and right hand threads at either end and axially slidably mounted or relative to block 40. The rod 71 and the spools 44 and 144 are reciprocally movable along lines parallel with each other. Threadedly mounted on one end of rod 71 is a bumper arm 72 including a set screw 25 adapted to engage or bump against the end of or actuate spool 44 and threadedly mounted on the other end of rod 71 is a bumper arm 73 adapted to actuate spool 144, each bumper being so positioned that when it moves its respective spool, it will compress the compressor spring 57 or 157 for that respective spool.

Bumpers 72 and 73 are restrained against rotation about rod 71 by suitable means, such for example, anti-rotation members 72' and 73'. One end of the rod 71 is connected through a suitable arm or connection 74 to the piston 24 in actuator 10 so that rod 71 is axially moved in corresponding relation with and by the piston 24. The opposite end of the rod 71 is connected to a servo motor 75 or other suitable means capable of imparting rotational adjustable movement to the rod 71. In this way the rod 71 is moved linearly or axially by the piston 24 and the bumpers 72 and 73 are axially and differentially positioned along the rod by the servo motor 75 since they are threaded on the rod. It is understood that the servo motor 75 may be connected at other positions to the rod or that other means may be used for adjustably rotating the rod to position the bumpers at desired axial positions therealong.

The control is completed by connecting each of the spools 44 and 144 to the oposite ends of an arm 77 pivotally mounted by pivot 78 on the block 40 in such manner that movement of one spool transmits movement through the arm 77 to the other spool. In this particular instance, movement of one spool in one direction causes movement of the other spool in the opposite direction.

Figure 2:
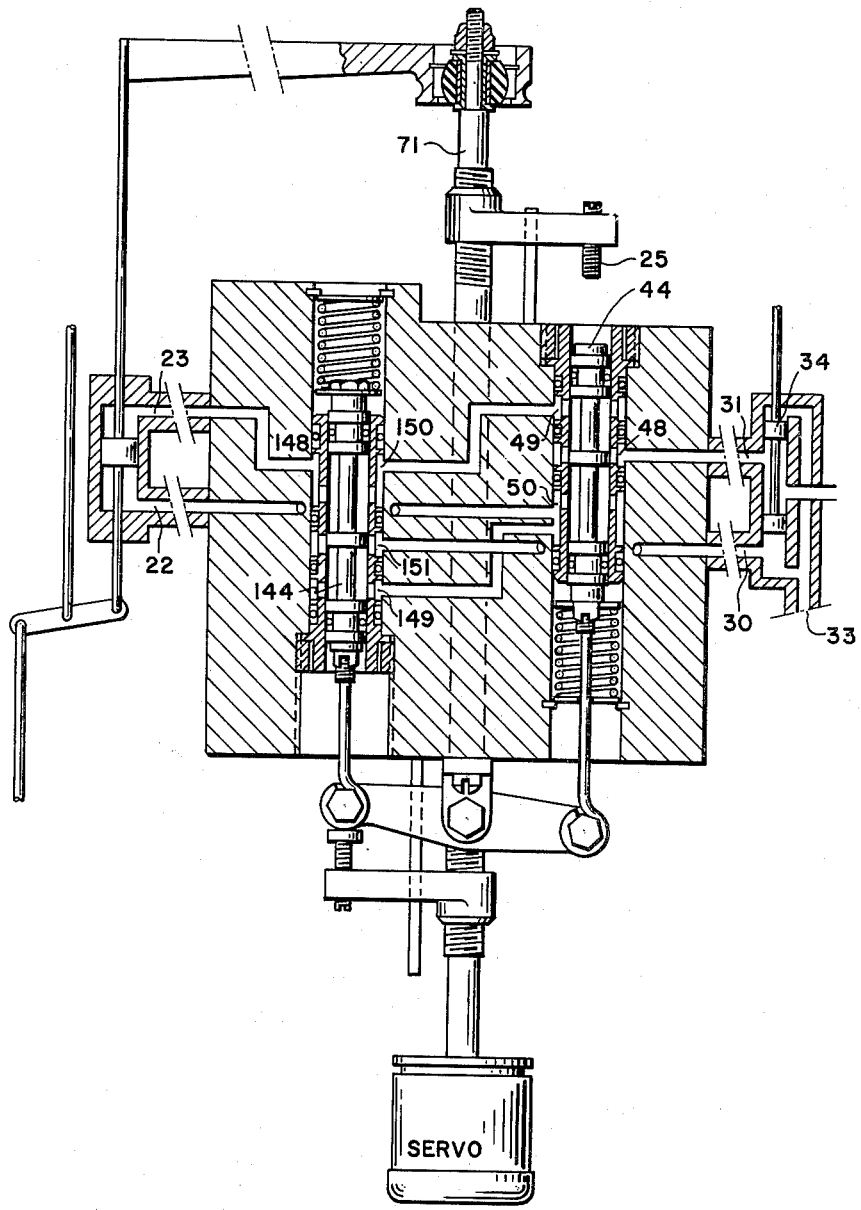
FIGURE 2 is a view similar to FIGURE 1 but showing the parts in another position of operation.

The device operates as follows starting with all parts in an initial position as illustrated in FIGURE 1:

When all parts are in this position, there is a passage for fluid into port 32 of servo valve 11 through port 31 to port 48 to port 50 to port 22 and thus into cylinder 18 on one side of piston 24. Fluid from the other side of piston 24 has a passage from port 23 to port 148 to port 151 to port 30 and to the reservoir port 33. The piston 24 will move upwardly in FIGURE 1 or toward port 23. The piston will continue to move in this direction until the servo valve 11 is nulled (spool 34 closes ports 30 and 31) or until the piston 24 commences to exceed its maximum allowable stroke. Assuming the servo valve 11 remains in its illustrated position and the spool 34 has not been moved, the piston 24 operating through connection 74 will move rod 71 upwardly in FIGURE 1. Bumper 73 will contact arm 77 and pivot it clockwise in FIGURE 1 about pivot 78. Further movement of piston 24 operating through the rod 71 and bumper 73 will cause the spool 144 to be translated or moved upwardly in FIGURE 1 and spool 44 to be translated or moved downwardly. This translation progressively limits all flow of fluid in port 48 and port 151 until the piston 24 ceases to move in the actuator 10. Should the servo motor or electromechanical servo positioner 75 call for a lesser allowable stroke position of the actuator piston rod 17 than has been obtained, the servo motor 75 will rotate the rod 71, further translating bumper 73 upwardly in FIGURE 1 and bumper 72 downwardly in FIGURE 1. This additional motion causes the spools 44 and 144 to move until the flow of fluid is as illustrated in FIGURE 2. At this time, the flow has reversed so that the flow of the fluid is from port 31 to port 48 to port 49 to port 150 to port 148 to port 23. The flow on the other side of piston 24 is from port 22 to port 50 to port 149 to port 151 to port 30 and reservoir port 33. This action has reversed the flow polarity and results in movement of piston 24 and piston rod 17 downwardly in FIGURE 1 until rod 71 is resting in the maximum allowable stroke position.

It is understood that reversal of the servo valve polarity or movement of the spool 34 downwardly in FIGURE 1 would result in reversal of the flow through the valves with the piston rod 17 moving downward until it reaches the corresponding stroke limit in this direction.

Although the present invention has been described with a certain degree of particularity, it is understood that various modifications in the details and arrangements of parts may be had without departing from the spirit and scope of the invention as hereinafter claimed.

I claim:

1. In a stroke actuating device, a cylinder, a piston ram reciprocally movable in said cylinder, valve means directing fluid into one end of said cylinder to move said ram in one direction or directing fluid into the other end of said cylinder to move said ram in an opposite direction, said valve means comprising a first two-way valve and a pair of second two-way valves connected between said first two-way valve and said cylinder, each of said pair of valves having a valve spool therein, a rod supported for axial movement with said ram, a first bumper threaded on said rod and associated with one of said spools to move it upon movement of said rod in one direction, a second bumper threaded on said rod and associated with the other of said spools to move it upon movement of said rod in the opposite direction, an arm interconnecting said spools to impart movement of either spool to the other spool.

2. In a stroke actuating device, a cylinder, a piston ram reciprocally movable in said cylinder, valve means directing fluid into one end of said cylinder to move said ram in one direction or directing fluid into the other end of said cylinder to move said ram in an opposite direction, said valve means comprising a first two-way valve and a pair of second two-way valves connected between said first two-way valve and said cylinder, each of said pair of valves having a valve spool therein, a rod rotatably supported for axial movement with said ram, a first bumper threaded on said rod and associated with one of said spools to move it upon movement of said rod in one direction, a second bumper threaded on said rod and associated with the other of said spools to move it upon movement of said rod in the opposite direction, an arm interconnecting said spools to impart movement of either spool to the other spool, and means for rotating said rod to position said bumpers axially therealong.

3. A device for moving and controlling the movement of a reciprocally movable member, said device comprising a first member movable between a first and a second position, a second member movable between a third and a fourth position and positionable at any desired position therebetween, a rocker arm pivoted on said first member and having one end connected to said second member and the other end connected to said reciprocally movable member, means controlling the positioning and movement of said second member to control the movement of said reciprocally movable member by said first member, said means including a cylinder, a piston in said cylinder connected to said second member, valve means directing fluid into said cylinder to move and position said piston therein, said valve means comprising a first two-way valve and a pair of second two-way valves connected between said first two-way valve and said cylinder, and a control interassociated with said piston and said pair of two-way valves to operate the valves upon movement of said piston to a predetermined position, said valve means being so connected to said cylinder that the movement of said piston corresponds to the movement of said first two-way valve until said piston moves to said predetermined position.

4. The structure as defined in claim 1 wherein each of said two-way valves has a valve spool and said control includes a rod rotatably supported by said piston for axial movement therewith, a first bumper on said rod and associated with one of said spools to move it upon movement of said rod in one direction, a second bumper on said rod and associated with the other of said spools to move it upon movement of said rod in the opposite direction, and an arm interconnecting said spools to impart movement of either spool to the other spool.

5. The structure as defined in claim 1 wherein each of said two-way valves has a valve spool and said control includes a rod rotatably supported by said piston for axial movement therewith, a first bumper threaded on said rod and associated with one of said spools to move it upon movement of said rod in one direction, a second bumper threaded on said rod and associated with the other of said spools to move it upon movement of said rod in the opposite direction, and an arm interconnecting said spools to impart movement of either spool to the other spool, and means for rotating said rod to position said bumpers axially therealong.

6. In combination, a cylinder, a piston reciprocable in said cylinder, a source of fluid under pressure, a first fluid passage connected to one end of said cylinder, a second fluid conduit connected to the other end of said cylinder, a valve connected to said source of fluid pressure and said first and second conduits for selectively either furnishing fluid under pressure to said first conduit and receiving fluid under pressure from said second conduit or furnishing fluid under pressure to said second conduit and receiving fluid under pressure from said first conduit, a pair of reciprocable double-acting slide valves interposed in said conduits and lever means connected to said piston for operating said slide valves at and beyond predetermined limits of travel of said piston to thereby reverse flow in said conduits to return said piston to said predetermined point.

7. A device as recited in claim 6 and further comprising motor means for continuously adjusting said predetermined limits of travel.

References Cited in the file of this patent

UNITED STATES PATENTS

| | | |
|---|---|---|
| 700,064 | Markham | May 13, 1902 |
| 897,736 | Good | Sept. 1, 1908 |
| 1,051,601 | Laursen | Jan. 28, 1913 |
| 1,361,904 | Rhodes | Dec. 14, 1920 |
| 2,064,051 | Allard | Dec. 15, 1936 |
| 2,067,492 | Kingsbury | Jan. 12, 1937 |
| 2,258,585 | Hedene | Oct. 14, 1941 |
| 2,351,263 | Harrington et al. | June 13, 1944 |
| 2,447,968 | Trotter | Aug. 24, 1948 |
| 2,596,242 | Hill | May 13, 1952 |
| 2,673,048 | Smith | Mar. 23, 1954 |
| 2,738,772 | Richter | Mar. 20, 1956 |
| 2,804,883 | Curlett | Sept. 3, 1957 |
| 2,863,243 | Moll | Dec. 9, 1958 |

FOREIGN PATENTS

| | | |
|---|---|---|
| 20,650 | Great Britain | Dec. 23, 1889 |